INVENTOR
ROGER E. PACKARD

BY

Christie, Parker & Hale
ATTORNEYS

INVENTOR.
ROGER E. PACKARD
BY
Christie, Parker & Hale
ATTORNEYS

United States Patent Office 3,425,036
Patented Jan. 28, 1969

3,425,036
DIGITAL COMPUTER HAVING A GENERALIZED LITERAL OPERATION

Roger E. Packard, Glendora, Calif., assignor to Burroughs Corporation, Detroit, Mich., a corporation of Michigan Filed Mar. 25, 1966, Ser. No. 537,380
U.S. Cl. 340—172.5 9 Claims
Int. Cl. G06f 9/06

ABSTRACT OF THE DISCLOSURE

A digital computer in which data operands may be stored in instruction words in the positions which normally contain digits indicative of a base-relative address of such an operand. Detection of the presence of an operand in the instruction is achieved by circuitry which detects a particular combination of digits in the positions within the instruction word which normally contain digits manifesting data field length. Responsive to detection of the particular combination of digits, a number of steps normally performed during the fetch operation are eliminated. Accordingly, a time saving in the fetch operation and a more efficient utilization of memory is achieved.

This invention relates to high speed digital computer systems and, more particularly, to such systems having a generalized literal operation applicable to the fetch of any instructions which call for the performance of operations on data stored in the system.

The operation of an automatic digital computer is generally split into two phases which normally alternate: the fetch phase and the execute phase. During the fetch phase of operation, the next instruction to be executed is selected from computer memory and transferred to one or more control registers after which selected modifications of the instruction may be introduced by means of base addition, indexing, indirect addressing, etc. During the execute phase of operation, an operation code segment of the instruction is decoded and the particular operation specified by the instruction is executed.

Both the instructions and data operands utilized in the execution of instructions may be stored in the same memory. The computer will ordinarily start with a word stored in some specified location in memory and interpret this word as an instruction. It will subsequently take instruction words from the memory locations in order unless a halt or branch instruction is encountered. Data to be used in executing the instruction will ordinarily be stored in another part of the memory. Flexibility is achieved since either instructions or data can be stored in the same storage registers.

Instructions requiring the performance of operations upon data stored in the memory will normally include digits indicative of the particular operation to be performed, digits indicative of the length of one or more data operands on which the operation is to be performed, and digits indicative of the addresses in memory where the data openands are located.

The present invention achieves both a saving in the time required for completion of the fetch operation and a more efficient utilization of the memory with respect to any data operand having a length no greater than the number of digits utilized in addressing the memory.

In brief, the advantages of the present invention are realized by means of storing data operands in the segment of an instruction word normally containing digits indicative of an address of a data operand. Thus, an operand rather than its address may be stored in the instruction word itself whenever the operand is of a length no greater than the number of digit locations reserved in the instruction for digits indicative of an operand address. Since the digits represent an actual data operand itself rather than its address they are said to represent a "literal." Other digits in the instruction word indicate the presence of a "literal" and denote its length. Since the instruction word is storing a data operand rather than digits indicative of its address, operations normally performed on all such digits such as base addition, indexing and indirect addressing, need not be performed thereby achieving a corresponding decrease in the amount of time required by the fetch operation. Additionally, a saving in the amount of required storage space in memory is achieved since the memory need not store both particular data operands and also digits indicative of the addresses of these operands.

For a complete understanding of the invention reference should be made to the accompanying drawing in which.

Figure 1:
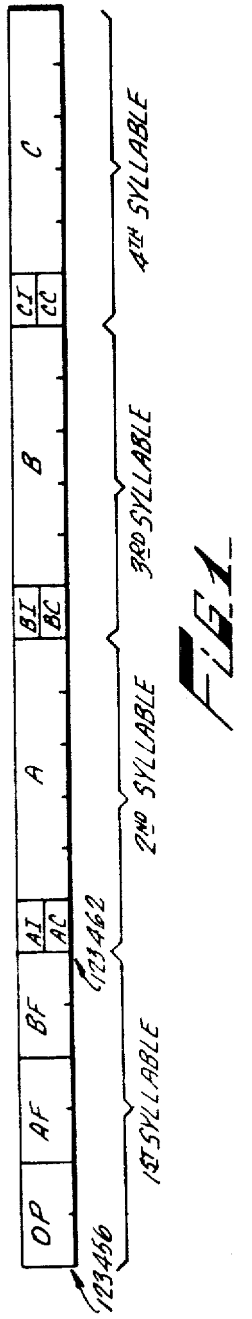
FIG. 1 depicts the format of a typical instruction word which may be utilized in conjunction with the present invention.

FIG. 1 depicts the format of a typical instruction word which may be utilized in conjunction with the present invention. It depicts an instruction word which consists of 24 binary coded decimal digits with each decimal digit comprising four binary bits. Each decimal digit is individually addressable in the embodiment shown in FIG. 4 and the instruction is considered to be divided into four six-digit syllables. The first two digits of the first syllable denote a particular instruction and are referred to as operation code digits. The remaining four digit positions of the first syllable are used as variants. The first two digit positions of the variants are referred to as the AF variant digits and the remaining two digit positions are referred to as the BF variant digits.

The second syllable consists of six decimal digits which make up an A address field, the third syllable consists of six digits which make up a B address field, and the fourth syllable consist of six digits which make up the C address field. The low order five digits of each address field represent a base relative address in core memory. The high order digit of each address field is split. Two bits of the high order digit are designated index bits and denote whether indexing is to be used and if so, which of several index registers is to be used. The remaining two bits of the high order digit are designated controller bits and denote whether indirect addressing is to occur and may also be used to indicate the nature of the data information contained in the data field designated by the particular address field.

In the embodiment of the present invention being described, each digit of an instruction is individually addressable and a syllable of six such digits will ordinarily be read out of memory during a single readout operation. The AF variant digits ordinarily give the length of the data field indicated by the A address and the BF variant digits ordinarily give the length of the data field indicated by the B address. The length of the data field indicated by the C address is ordinarily given by the lower of the AF and BF variant digits or by some combination of the two. During the fetch operation an instruction such as that depicted in FIG. 1 is ordinarily read out of memory a syllable at a time. Certain operations are performed upon these syllables at this time. These operations modify the base relative addresses within the address fields and produce absolute addresses whereat the data fields indicated by the address fields are stored.

In the embodiment of the present invention being described, six digits are used to denote each address in memory. The low order five digits of each address field represent a base relative address. To this base relative address must be added a base address value in order to achieve a six digit address. Additionally, indexing operations and indirect addressing operations may be performed before a six digit address is determined which represents the location in memory of the first digit of a data operand indicated by the address field. Thus, a number of operations may be required before the actual address of a data operand address indicated by an address field is finally determined. Not only must a number of time consuming steps be performed, but in addition the memory must store both the six digit address field associated with a particular data operand as well as the digits of the data operand itself. It may be seen that whenever the number of digits in the data operand field is six or less, these digits may be stored in the address field portion of an instruction word. In accordance with the present invention, storage of such operands in instruction words achieves both a reduction in the number of necessary operations to be performed during the fetch cycle of operation and a saving in the amount of storage space required in the memory.

Storage of a data operand in an instruction word is necessarily limited to such operands which have a field length of six or fewer digits. Since the field length of such operands is limited to six, the variant digits which normally indicate field length are not fully utilized. In this invention these variant digits are utilized to indicate the presence of a data operand (literal) in an instruction word, the type of information manifested by the literal, and the length of the literal.

Figure 2:
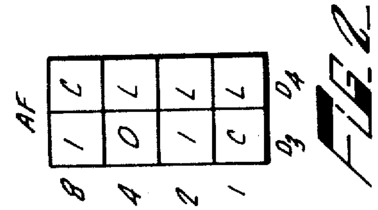
FIG. 2 depicts a manner in which two digits of the instruction word of FIG. 1 may be utilized to denote the presence in the instruction of a literal and to convey information about the literal.

FIG. 2 depicts the manner in which the two AF digits of the instruction word of FIG. 1 may be utilized to denote the presence of a literal in the A address field location of the instruction and to convey information about that literal. FIG. 2 depicts the four bits of each of the digits making up the AF variant digits. These digits are denoted D3 and D4. The bit locations of each digit are denoted the 8-bit, 4-bit, 2-bit, and 1-bit locations. The presence of a literal in the A field is manifested by the presence of binary "1's" in the 8-bit and 2-bit locations of digit D3. The 4-bit location of digit D3 has a binary "0" stored therein at this time. The 1-bit location of digit D3 and the 8-bit location of digit D4 are utilized to specify the format of the literal. Thus the unsigned numeric format may be indicated by a "0" in the 1-bit location of digit D3, and by a "0" in the 8-bit location of digit D4; the signed numeric format may be indicated by a "0" in the 1-bit location of digit D3 and by a "1" in the 8-bit location of digit D4; and an 8-bit alpha numeric format may be indicated by a "1" in the 1-bit location of digit D3 and a "0" in the 8-bit location of digit D4. The length of the literal is indicated by the 4-bit, 2-bit and 1-bit locations of digit D4. The length may vary from "1" to "6" for unsigned 4-bit numeric format; from "1" to "5" for signed numeric 4-bit format; and from "1" to "3" for 8-bit format. The use of controller bits to indicate the format of particular data operands is disclosed in the copending application of Lloyd M. Cherry et al., Ser. No. 537,506, filed on even date herewith and assigned to the assignee of the present application.

Figure 3A:
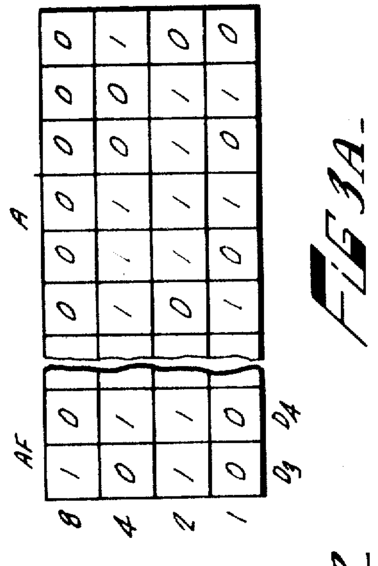
FIGS. 3A, 3B and 3C depict portions of three exemplary instruction words in which literals are indicated.
Figure 3B:
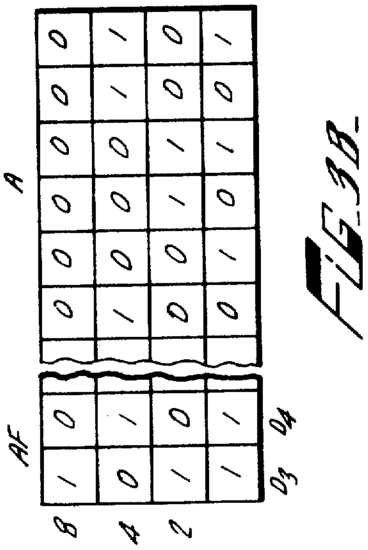
Figure 3C:
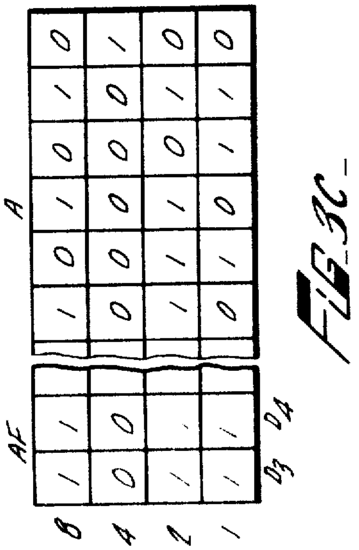

FIGS. 3A, 3B, and 3C depict portions of three exemplary instruction words in which particular literals of various format have been stored. These literals are stored in each case in the A address field of the instruction and their format and length are indicated by bits of the AF variant digits. Thus, in FIG. 3 the presence of a literal is indicated by "1's" in the 8-bit and 2-bit locations of digit D3 and by a "0" in the 4-bit location of digit D3, unsigned numeric format is indicated by "0's" in the 1-bit location of digit D3, and the 8-bit location of digit D4; and the length of "6" is indicated by "1's" in the 4-bit location and 2-bit location of digit D4. Therefore, the literal stored in the A address field bits is the unsigned numeric literal 567234, as indicated by the "1's" and "0's" stored in the bits of each digit position of the A address field. Similarly, FIG. 3B indicates the storage in an A address field of a different literal. In this example "1's" in the 8-bit location and 2-bit location of digit D3 indicate the presence of the literal; a "1" in the 1-bit location of digit D3 and a "0" in the 8-bit location of digit D4 indicate signed numeric format and the "1's" in the 4-bit location and 1-bit location of digit D4 indicate a length of 5. Since signed numeric format is indicated, the first digit of the A address field is utilized in determining the sign. In the present embodiment, a "1" in the 4-bit location of the first digit indicates that the sign is minus. Therefore, the literal stored in the example of FIG. 3B is minus 12345.

FIG. 3C indicates the storage of another literal in the A address field of an instruction word. Again, "1's" in the 8-bit and 2-bit locations of digit D3 indicate the presence of the literal in the A address. "1's" in the 1-bit location of digit D3 and in the 8-bit location of digit D4 indicate that the literal format is 8-bit format rather than 4-bit format. Thus, the literal is made up of 8-bit characters rather than 4-bit decimal digits and the maximum length of the literal is therefore three characters in length. "1's" in the 2-bit location and 1-bit location of digit D4 indicate that the length is 3. The "1's" and "0's" in the A address field bit positions are utilized to determine a three character alpha numeric word. In accordance with one alpha numeric code, the "1's" and "0's" stored in the A address field of FIG. 3C manifest the character CAT.

Figure 4:
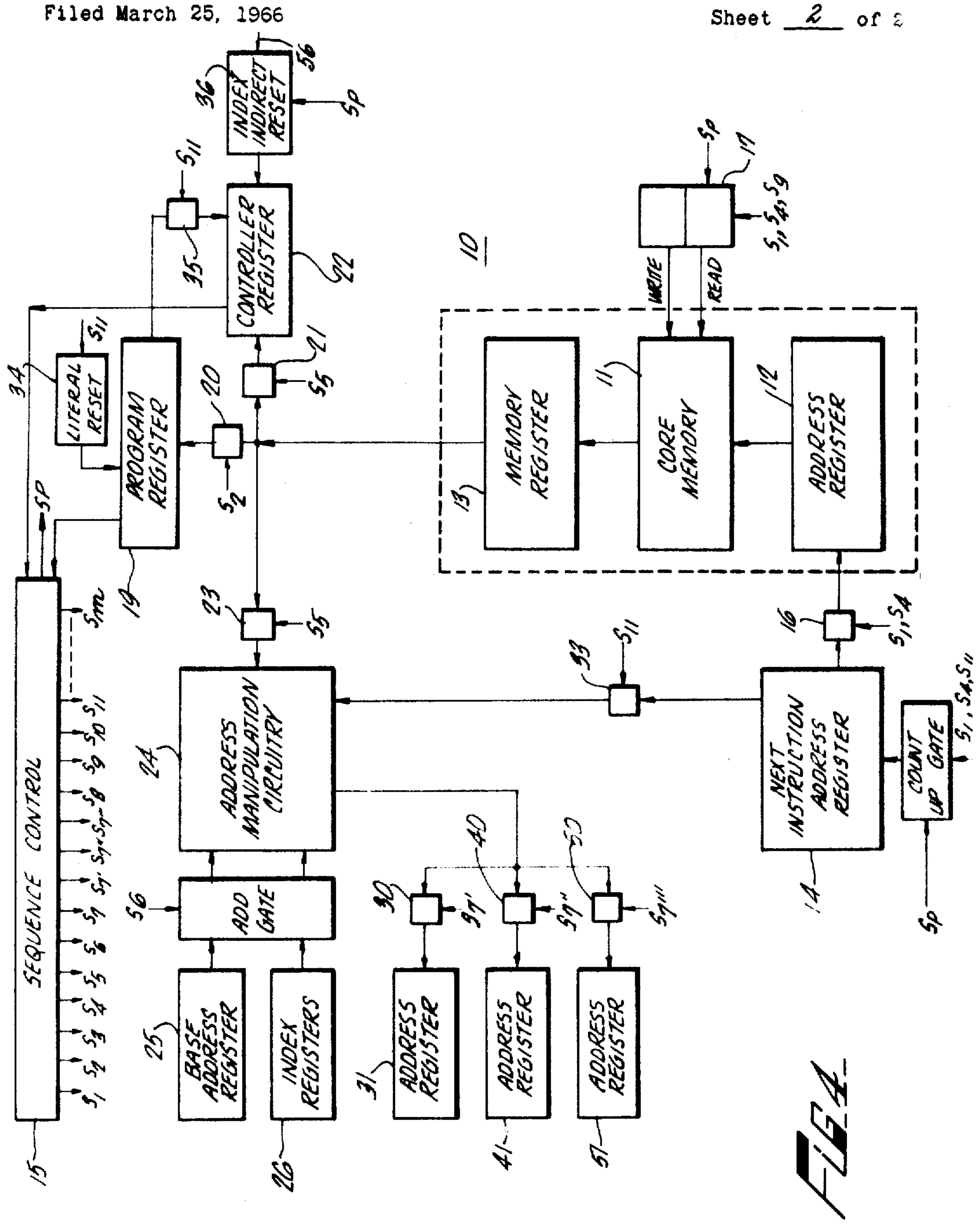
FIG. 4 depicts a schematic block diagram of one embodiment of the present invention utilizing instruction words of the format depicted in FIGS. 1 and 2.

FIG. 4 depicts a schematic block diagram of one embodiment of the present invention utilizing words of the format depicted in FIGS. 1 and 2.

In FIG. 4 numeral 10 indicates generally a memory unit which, for example, includes a core memory 11 which is addressed by the contents of an address register 12. In the embodiment shown, six-digit syllables are transferred in and out of core memory 11 through a memory register 13. Program instructions are stored in core memory 11 in sequential locations. The instructions are brought out of memory in response to addresses established in next instruction address register 14 which is counted up following the transfer of each syllable from memory 11 into register 13.

In the embodiment shown, registers 12, 13, and 14 are six-digit registers. Since each digit stored in memory 11 is individually addressable and since six-digit syllables are read out of memory 11 and stored into register 13 during each read operation of the embodiment of the present invention shown in FIG. 4, register 14 will be counted up by six following each read operation. Thus, for example, if the first digit of the operation code of the branch instruction shown in FIG. 1 is located in address 123456, the first syllable of this instruction will be read out of core memory during a read operation which commences at a time when register 14 stores the address 123456. Upon the completion of this read operation register 14 would be counted up by six so as to store address 123462 which is the address of the first digit of the second syllable of the instruction word shown in FIG. 1. The second syllable of this instruction word will thereby be transferred into register 13 during a subsequent read operation.

The operation of the embodiment shown in FIG. 4 is under the control of a sequence control unit 15. Unit 15 is a central control unit which typically includes a clock pulse source and a sequence control by means of which the sequence control unit is caused to step through a series of sequential steps in which output control lines designated by $S_1$ through $S_m$ are energized in a controlled sequence. Sequence control unit 15 also includes combination gating circuitry which in response to signals applied to unit 15 controls the sequence in which the output control lines are energized. Such sequence control units are well known in the computer and data processing art.

Initially the sequence control unit 15 is in the $S_1$ state during which state the first syllable of the first instruction is brought out of memory 11 and inserted into memory register 13. To this end the contents of the register 14 which comprises the address of the initial digit of this syllable are transferred to address register 12 via AND gate 16. Sequence pulses designated SP are generated by sequence control unit 15 at the time the control unit changes from one control state to the next. An SP signal generated at the end of the $S_1$ state reads the addressed syllable out of core memory 11 into memory register 13, the SP signal being gated by gate 17 to the read input of core memory 11. At this time register 14 is counted up by six so as to store the address of the first digit of the succeeding syllable stored in memory 11. At the completion of the $S_1$ state, the sequence control unit 15 advances to the $S_2$ state.

During the $S_2$ state, the syllable in memory register 13 is transferred to a six-digit program register 19 by means of AND gate 20. The first syllable of the instruction, including the operation code digits, the AF variant digits, and the BF variant digits, is now stored in register 19. The central control unit now advances to the $S_3$ state.

During the $S_3$ state, combinational gating circuitry within sequence control unit 15 is now utilized to detect the presence of particular combinations of bits stored in register 19. One particular combination of bits detected at this time is the combination within the operation code digits which indicates that the instruction is a conditional branch operation. Operations which may follow upon the detection of a conditional branch operation are described in the copending application of R. Packard and W. Buster, Ser. No. 537,572, filed on even date herewith and assigned to the assignee of the present application. Additionally, during state $S_3$ the presence of a literal in the instruction is detected. In the embodiment shown, the presence of a literal is detected by means of the presence of "1's" in the 8-bit location and 2-bit location of digit D3 of the AF digits as shown in FIG. 2. If a literal is detected during state $S_3$, the sequence control unit 15 advances to the $S_{11}$ state.

During the $S_{11}$ state, the address stored in register 14 is transferred via AND gate 33 to an address register within address manipulation circuitry 24. Also during state $S_{11}$, literal reset means 34 resets to "0" the 8-bit location and 2-bit location of digit D3 stored in register 19 which previously had indicated the presence of the literal. Also during state $S_{11}$ the controller bits in the 1-bit location of digit D3 and in the 8-bit location of digit D4 are transferred via gate 35 to controller register 22 and these bit locations stored in register 19 are similarly reset to "0." At the end of state $S_{11}$ address register 14 is again counted up by six.

Upon the completion of state $S_{11}$, all of the bit locations of digits D3 and D4 stored in register 19 have been reset to "0" except the digits in bit locations 4, 2, and 1 of digit D4. Bits in these three bit locations indicate the length of the literal in the A address field of the instruction. The controller bits which have been transferred to register 22 indicate the particular format of the literal. Examples of literals of different format are shown in FIGS. 3A, 3B, and 3C. The use of controller bits to indicate the format of particular data is described in the copending application of Cherry et al. referred to hereinbefore.

Upon the completion of the $S_{11}$ state, sequence control unit 15 is reset to the $S_7$ state. During the $S_7$ state the address stored in circuitry 24 is transferred via AND gate 30 to a first instruction address register 31.

Instruction address registers 31, 41 and 51 store the addresses of data operands upon which operations are to be performed during a subsequent execute phase of operation. They are six-digit registers and receive these addresses, during state $S_7$, the particular register into which an address is stored being governed by the signals $S_7'$, $S_7''$ and $S_7'''$ generated by control unit 15. Thus, signal $S_7'$ causes an address stored in circuitry 24 to be transferred to the first register 31 via gate 30 during state $S_7$. Signal $S_7''$ causes such an address to be stored in the second address register 41 via gate 40, and signal $S_7'''$ causes such an address to be stored within the third register 51 via gate 50.

Upon the conclusion of state $S_7$, the address of the second syllable of the instruction, having been determined to be a literal, has now been stored in the first instruction address register 31. Sequence control unit 15 is now reset to state $S_4$.

During state $S_4$ the address of the third syllable, the B address field, of the instruction word which is now stored in register 14 is transferred via AND gate 16 to address register 12. A subsequent SP signal from control unit 15 causes the third syllable of the instruction to be read out of core memory 11 and stored in memory register 13. Upon the conclusion of state $S_4$ register 14 is counted up by six and the control unit advances to state $S_5$.

During state $S_5$ the first digit stored in register 13 is transferred via gate 21 to controller register 22 and the remaining five digits stored in register 13 are transferred via gate 23 to circuitry 24. Control unit 15 next advances to state $S_6$.

At the commencement of state $S_6$, controller register 22 stores the indexing bits and controller bits of the second address field of the instruction while circuitry 24 stores the five digits of the address field which designate a relative address. During state $S_6$ various predetermined manipulations are performed upon this relative address in order to achieve an absolute address indicative of another data operand upon which operations will be performed during the subsequent execute phase of operation. It is during state $S_6$ that base address register 25 is used to add a fixed base value to the relative address and it is during state $S_6$ that index values from one of a plurality of index registers 26 may be added to the relative address and it is also during state $S_6$ that indirect addressing may be performed. All of these operations are described, for example, in the copending application of Packard and Buster referred to hereinbefore.

At the end of state $S_6$, reset means 36 is used to reset to "0" the bits within the first digit stored in register 22 which direct that indexing or indirect addressing be performed during state $S_6$. At the conclusion of state $S_6$ the control unit 15 advances to state $S_7$.

During state $S_7$, circuitry 24 is storing an absolute address indicative of the address of a data operand upon which operations are to be performed during the subsequent execute phase of operation and this absolute address is transferred during state $S_7$ via gate 40 to second information address register 41.

Since the particular instruction being fetched has three address fields, sequence control unit 15 is now reset again to state $S_4$ and during states $S_4$, $S_5$, $S_6$ and $S_7$, the C address field, the fourth syllable of the instruction, is read out of memory 11, manipulations are performed upon the relative address portion of the C address field to obtain an absolute address and this absolute address is stored in a third information address register 51. The operations performed upon the C address field are identical to those just described with respect to the B address field.

At the conclusion of the $S_7$ state during which the absolute address obtained by means of manipulations performed upon the relative address portion of the C address field has been stored in third information address register 51, the sequence control unit 15 advances to the $S_8$ state during which the execution of the particular instruction which has been fetched commences.

As a result of the storage within the instruction word of FIG. 1 of a literal in the A address field, it is apparent that no manipulations need be performed upon any part of the A address field during the fetch of this instruction. Additionally, core memory 11 need not store both an A address field comprising a controller digit and relative address digits and in addition an A data operand since the data operand itself is stored in the digit locations usually reserved for the controller digit and relative address digits.

Although the embodiment of FIG. 4 has been described in connection with the fetch of a four syllable instruction in which a literal is stored in the second syllable, it is apparent that a literal could either alternatively or additionally be stored in other syllables of the instruction, and that the instruction may be of varied length. Additionally, although the address of the first digit of the literal was transferred from register 14 to circuitry 24 and thence to register 31, during the description of the embodiment shown in FIG. 4, it is apparent that since no manipulations were performed upon the address of the literal that it could be transferred directly from register 14 to the proper information address register 31, 41, or 51.

What has been described is considered to be only an illustrative embodiment of the present invention. Accordingly, it is to be understood that various and numerous other arrangements may be devised by one skilled in the art without departing from the spirit and scope of the present invention.

What is claimed is:

1. A data processing system comprising:
memory means for storing a plurality of binary coded words including a plurality of data words and a plurality of instruction words;
the instruction words comprising a plurality of bits arranged in a plurality of individually addressable syllables, each instruction word having a first syllable comprising operation bits and variant bits and a second syllable comprising address field bits;
a first register storing the address of the first syllable of a first instruction word stored in the memory;
a second register;
means for transferring to the second register the first syllable of the first instruction word;
means for establishing the address of the second syllable of the first instruction word in the first register;
means utilizing the variant bits stored in the second register for determining whether the second syllable of the first instruction word constitutes a data word;
a third register;
means, responsive to a determination that the second syllable does constitute a data word, for transferring the address of the second syllable from the first register to the third register;
a fourth register; and
means, responsive to a determination that the second syllable does not constitute a data word, for transferring the second syllable from the memory to the fourth register.

2. A data processing system comprising:
memory means for storing a plurality of binary coded words including a plurality of data words and a plurality of instruction words;
each of the words comprising individually addressable digits, a particular number of such digits constituting a syllable;
a first register storing the address of the first digit of a first instruction word stored in the memory, the first instruction word comprising a plurality of syllables;
a second register;

means for transferring to the second register the first syllable of the first instruction word;
the first syllable including a plurality of operation code digits, and a plurality of variant digits;
means for establishing in the first register the address of the first digit of the second syllable of the first instruction word;
means utilizing bits stored in particular first bit positions of the variant digits for determining whether the second syllable of the first instruction word constitutes a data word;
a third register;
means, responsive to a determination that the second syllable does constitute a data word, for transferring the address of the second syllable from the first register to the third register;
a fourth register;
means responsive to a determination that the second syllable does not constitute a data word for transferring particular digits of the second syllable to the fourth register, these particular digits comprising a relative address;
means for performing predetermined manipulations upon the relative address thereby obtaining an obsolute address; and
means for storing the absolute address in the third register.

3. A data processing system comprising:
memory means for storing a plurality of binary coded words including a plurality of data words and a plurality of instruction words;
each of the words comprising individually addressable digits, a particular number of such digits constituting a syllable;
a first register storing the address of the first digit of a first instruction word stored in the memory;
the first instruction word comprising first, second, and third syllables;
the first syllable including a plurality of operation code digits, a first plurality of variant digits and a second plurality of variant digits; the first plurality of variant digits being associated with the second syllable and the second plurality of variant digits being associated with the third syllable;
a second register;
means for transferring to the second register the first syllable of the first instruction word;
means for establishing in the first register the address of the first digit of the second syllable of the first instruction word;
means utilizing bits stored in particular first bit positions of the first plurality of variant digits for determining whether the second syllable constitutes a data word;
means responsive to a determination that the second syllable does contain a data word for transferring the address of the first digit of the second syllable from the first register to a first data address register;
a third register;
means for transferring to the third register the third syllable of the first instruction word;
the last mentioned determining means utilizing bits stored in particular first bit positions of the second plurality of variant digits for determining whether the third syllable constitutes a data word;
a fourth register;
means, responsive to a determination that the third syllable does not contain a data word, for transferring particular digits of the third syllable to the fourth register;
means for performing predetermined manipulations upon the digits stored in the fourth register; and
means for transferring to a second data address register the digital value resulting from the last mentioned manipulations.

4. A data processing system comprising:

memory means for storing a plurality of binary coded words including a plurality of data words and a plurality of instruction words;

each of the words comprising individually addressable digits, a particular number of such digits constituting a syllable;

a first register storing the address of the first digit of a first instruction word stored in the memory;

the first instruction word comprising a plurality of syllables, the first syllable having a plurality of operation code digits and a plurality of variant digits;

a second register;

means for transferring to the second register the first syllable of the first instruction word;

means for establishing in the first register the address of the first digit of the second syllable of the first instruction word;

particular binary values stored in first particular bit locations of the variant digits indicating that the second syllable constitutes a data word;

means for determining whether the second syllable constitutes a data word comprising means for detecting the presence of the particular binary values stored in the first particular bit locations;

a data address register;

means responsive to a determination that the second syllable does contain a data word for transferring the address of the first digit of the second syllable to the data address register; and means for erasing the particular binary values from the first particular bit positions of the variant digits.

5. A data processing system according to claim 4 further comprising:

a controller register;

means for transferring to the controller register binary values stored in second particular bit positions of the variant digits, these values being indicative of the format of the second syllable data word.

6. A data processing system comprising:

memory means for storing a plurality of binary coded words including a plurality of data words and a plurality of instruction words;

each of the words comprising individually addressable digits, a particular number of such digits constituting a syllable;

a first register storing the address of the first digit of a first instruction word stored in the memory;

the first instruction word comprising a plurality of syllables, the first syllable having a plurality of operation code digits and a plurality of variant digits, the variant digits being associated with the second syllable;

a second register;

means for transferring to the second register the first syllable of the first instruction word;

means for establishing in the first register the address of the first digit of the second syllable of the first instruction word;

particular binary values stored in first particular bit locations of the variant digits indicating that the second syllable comprises a data word, binary values stored in second particular bit locations indicating the format of the data word, and binary values stored in third particular bit locations indicating the length of the data word;

means for determining whether the second syllable constitutes a data word comprising means for detecting the presence of the particular binary values stored in the first particular bit locations;

a data address register;

means responsive to a determination that the second syllable does contain a data word for transferring the address of the first digit of the second syllable to the data address register;

means for erasing the particular binary values from the first particular bit locations of the variant digits stored in the second register;

a controller register; and means for transferring to the controller register the binary values stored in the second particular bit locations of the variant digits and for erasing these values from the variant digits, the resulting values of the variant digits stored in the second register being indicative of the length of the data word in the second syllable.

7. A data processing system comprising:

memory means for storing a plurality of binary coded words including a plurality of data words and a plurality of instruction words;

each of the words comprising individually addressable digits, a particular number of such digits constituting a syllable;

a first register storing the address of the first digit of a first instruction word stored in the memory;

the first instruction word comprising first, second, and third syllables;

the first syllable including a plurality of operation code digits, a first plurality of variant digits and a second plurality of variant digits; the first plurality of variant digits being associated with the second syllable and the second plurality of variant digits being associated with the third syllable;

a second register;

means for transferring to the second register the first syllable of the first instruction word;

means for establishing in the first register the address of the first digit of the second syllable of the first instruction word;

particular binary values stored in first particular bit locations of the first plurality of variant digits indicating that the second syllable comprises a data word, binary values stored in second particular bit locations indicating the format of the data word, and binary values stored in third particular bit locations indicating the length of the data word;

means for determining whether the second syllable constitutes a data word comprising means for detecting the presence of the particular binary values stored in the first particular bit positions;

a first address register;

means responsive to a determination that the second syllable does contain a data word for transferring the address of the first digit of the second syllable to the first data address register;

means for erasing the particular binary values from the first particular bit locations of the variant digits stored in the second register;

a controller register;

means for transferring to the controller register the binary values stored in the second particular bit locations of the first plurality of variant digits and for erasing these values from the variant digits, the resulting values of the first plurality of variant digits stored in the second register being indicative of the length of the data word in the second syllable;

a third register;

means for transferring to the third register the third syllable of the first instruction word;

the values of the second plurality of variant digits indicating the length of another data word, binary values stored in first particular bit locations of the second plurality of variant digits indicating that the third syllable does not comprise a data word;

the determining means determining that the third syllable does not contain a data word;

a fourth register;

means responsive to a determination that the third syllable does not contain a data word for transferring one digit of the third syllable to the controller register and other digits of the third syllable to the fourth register;

means for performing predetermined manipulations upon the digits stored in the fourth register; and means for transferring to a second data address register the digital value resulting from the last mentioned manipulations.

8. A data processing system comprising:

memory means for storing a plurality of binary coded words including a plurality of data words and a plurality of instruction words;

each of the words comprising individually addressable digits, $m$ such digits constituting a syllable;

a first register storing the address of the first digit of a first instruction word stored in the memory, the address consisting of $m$ digits;

the first instruction word comprising a plurality of syllables, the first syllable including $n$ operation code digits and $o$ variant digits;

a second register;

means for transferring to the second register the first syllable of the first instruction word;

means for establishing in the first register the $m$-digit address of the first digit of the second syllable of the first instruction word;

particular binary values stored in first particular bit locations of the variant digits indicating that the second syllable constitutes a data word;

means for determining whether the second syllable constitutes a data word comprising means for detecting the presence of the first particular binary values stored in the first particular bit locations;

a data address register; and means responsive to a determination that the second syllable does contain a data word for transferring the $m$-digit address of the first digit of the second syllable from the first register to the data address register.

9. A data processing system comprising:

memory means for storing a plurality of binary coded words including a plurality of data words and a plurality of instruction words;

each of the words comprising individually addressable digits, $m$ such digits constituting a syllable;

a first register storing the address of the first digit of a first instruction word stored in the memory, the address consisting of $m$ digits;

the first instruction word comprising first, second, and third syllables;

the first syllable consisting of $n$ operation code digits, a first group of $o$ variant digits, and a second group of $o$ variant digits; the first group of $o$ variant digits being associated with the second syllable and the second group of $o$ variant digits being associated with the third syllable;

a second register;

means for transferring to the second register the first syllable of the first instruction word;

means for establishing in the first register the $m$-digit address of the first digit of the second syllable of the first instruction word;

particular binary values stored in first particular bit locations of the first group of $o$ variant digits indicating that the second syllable comprises a data word, binary values stored in second particular bit locations indicating the format of the data word, and binary values stored in third particular bit locations indicating the length of the data word;

means for determining whether the second syllable constitutes a data word comprising means for detecting the presence of the particular binary values stored in the first particular bit locations;

a first data address register;

means responsive to a determination that the second syllable does contain a data word for transferring the $m$-digit address of the first digit of the second syllable to the first data address register;

means for erasing the particular binary values from the first particular bit locations of the first group of $o$ variant digits stored in the second register;

a controller register;

means for transferring to the controller register the binary values stored in the second particular bit locations of the first group of $o$ variant digits and for erasing these values from the variant digits, the resulting first group of $o$ variant digits stored in the second register being indicative of the length of the data word stored in the second syllable;

a third register;

means for transferring to the third register the third syllable of the first instruction word;

the second group of $o$ variant digits indicating the length of another data word, binary values stored in first particular bit locations of the second group of $o$ variant digits indicating that the third syllable does not comprise a data word;

the determining means determining that the third syllable does not contain a data word;

means responsive to a determination that the third syllable does not contain a data word for transferring $p$ digits of the third syllable to the controlller register and the remaining $q$ digits of the third syllable to a fourth register;

means for performing predetermined manipulations on the $q$ digits stored in the fourth register which produce a $m$-digit address;

a second data address register; and means for transferring to the second data address register the $m$-digit address resulting from the last mentioned manipulations.

References Cited

UNITED STATES PATENTS

| | | | |
|---|---|---|---|
| 3,331,056 | 7/1967 | Lethin et al. | 340—172.5 |
| 3,327,294 | 6/1967 | Furman et al. | 340—172.5 |
| 3,302,177 | 1/1967 | Bina | 340—172.5 |
| 3,251,040 | 5/1966 | Burkholder et al. | 340—172.5 |
| 3,251,037 | 5/1966 | Coil et al. | 340—172.5 |
| 3,249,920 | 5/1966 | Pulver | 340—172.5 |
| 3,247,490 | 4/1966 | Kregness et al. | 340—172.5 |
| 3,243,781 | 3/1966 | Ethrman et al. | 340—172.5 |
| 3,200,379 | 10/1965 | King et al. | 340—172.5 |
| 3,337,854 | 8/1967 | Cray et al. | 340—172.5 |
| 3,266,020 | 8/1966 | Cheney et al. | 340—172.5 |

PAUL J. HENON, *Primary Examiner.*

G. D. SHAW, *Assistant Examiner.*